May 30, 1933.  F. H. OWENS  1,911,845
COMBINED MOTION PICTURE CAMERA AND PROJECTOR
Filed Oct. 18, 1928  4 Sheets-Sheet 2

INVENTOR
Freeman H. Owens
BY
ATTORNEYS

Patented May 30, 1933

1,911,845

UNITED STATES PATENT OFFICE

FREEMAN H. OWENS, OF NEW YORK, N. Y.

COMBINED MOTION PICTURE CAMERA AND PROJECTOR

Application filed October 18, 1928. Serial No. 313,312.

This invention relates to motion picture apparatus, and has special reference to the provision of an improved combined motion picture camera and projector, and particularly of the portable type.

The prime desideratum of my present invention centers about the making of a combined motion picture camera and projector capable of being readily set up for either camera or projector use and of being quickly converted from one such use to the other, and embodying simple and efficient means manipulable manually for controlling the various operations of the combination during both camera and projector use of the same.

To accomplish this prime desideratum, the objects of the invention include more specifically the provision of a combined motion picture camera and projector embodying a film operating and exposure mechanism common to the projector and camera operable from different sources of motive power, one source of power being used with the mechanism when employed as a camera and another source of power being used with the mechanism when employed as a projector; the further provision of a combined taking and projecting apparatus in which the motive source for the apparatus when used as a camera is a spring motor forming part of and housed within the casing, and in which the motive power for the apparatus when used as a projector is an externally arranged motor connectible at the will of the operator to the apparatus; the further provision of a combined projector and camera having a film operating and exposure mechanism common to the projector and camera and embodying a start and stop device for said mechanism controllable in a simple and facile way by the operator and utilizable in the same way during both camera and projector use of the combination; the still further provision of a combined apparatus of this nature in which the driving connection between the projector motive source and the film operating and exposure mechanism is manually controlled, preferably simultaneously with the operating control of the start and stop device, these constructions being such as to accomplish in a simple and efficacious way a variety of functions for the apparatus during its uses as a camera and projector so that:

(a) The common operating mechanism for the camera and projector may be operated interchangeably by a spring motor (for camera use) and an electric motor (for projector use).

(b) The interchangeability of the spring and electric motors may be effected by manually changing only the driving connection between the film operating mechanism and the electric motor, the driving connection between the spring motor and the operating mechanism being automatically operative during camera use and being automatically inoperative or ineffective during projector use of the combination.

(c) The start and stop device may be common to the camera and projector, and may be operated simultaneously with the operation of the driving connection between the projector motor and the operating mechanism and manipulated by a single manually operable element, and so that (d) The start and stop device may be actuated to stop the said film operating and exposure mechanism in a way to stop the camera shutter in closed position and the projector shutter in open film projecting position.

A further prime object of the present invention centers about the provision of a combined camera and projector embodying a fire shutter the operation of which is controlled by the manually manipulable means which controls the actuation of the aforesaid start and stop device whereby during projector use of the apparatus the fire shutter will be operated to open position when the film operating mechanism is unlocked and will be operated to a beam intercepting position when the film operating mechanism is locked with the projector shutter thereof in its open position whereby the fire shutter will become operative for a still projection.

A still further prime object of the invention relates to the making of a combined projector and camera embodying a spring motor and a start and stop device for the film operating and exposure mechanism and embodying means associated with the start and stop device and supplementing the action of the spring motor during starting operation of the start and stop device to impart a kick-off impulse to the mechanism for the purpose of speeding the start thereof and for the purpose of compensating for the starting inertia of the spring motor.

A further prime object of the invention has for its purpose the making of a combined camera and projector in which all of the aforesaid mechanism, devices and parts are organized into a compact organization for portable or/and compact use and for operation and control by the user or amateur operator in a very facile, easily understandable way.

To the accomplishment of the foregoing and such other objects as will hereinafter appear, my invention consists in the elements and their relation one to the other as more particularly described hereinafter and sought to be defined in the claims; reference being had to the accompanying drawings, which show the preferred embodiment of my invention, and in which:

Figure 1:
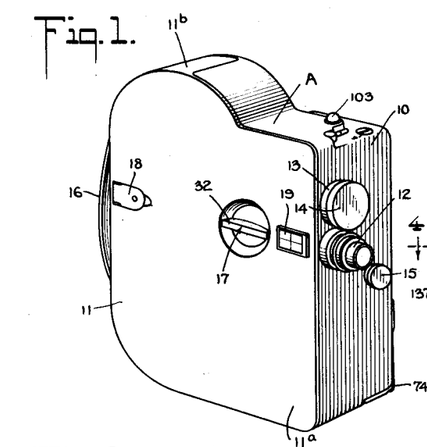
Fig. 1 is a perspective view of the combined camera and projector in closed condition.

Referring now more in detail to the drawings and having reference particularly to Figs. 1 to 7 thereof, the combined motion picture projector and camera of my invention comprises a casing A which contains and houses all of the operating parts of the film operating and exposure mechanism generally designated as B. The casing A preferably comprises a body 10 and a removable cover 11 forming together a unit which defines a camera, as shown in Fig. 1 of the drawings, and which may be attached to a lamp house in the manner suggested in Fig. 7 of the drawings and as more particularly set forth and claimed in my copending application Serial No. 267,157, filed April 4, 1928, to Projection machine to form a projector.

Figure 2:
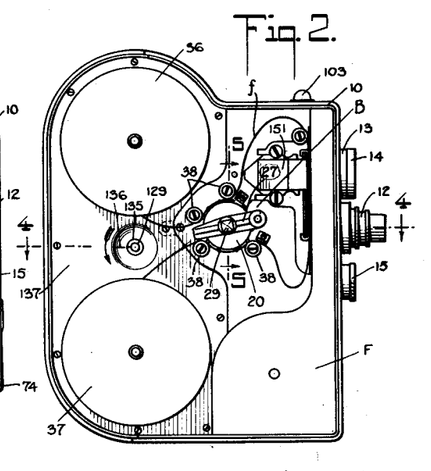
Fig. 2 is a side elevational view thereof with the cover removed.

The body 10 of the camera and projector casing A carries and supports the film operating and exposure mechanism B which includes a camera lens mount and system 12 and a projection lens mount 13 both arranged in vertical alignment in the front wall of the casing body 10, the projection lens mount 13 being closed by a cap 14 during camera use of the machine. The front wall of the casing body 10 is also provided with a means 15 closed during camera use of the casing, as shown in Figs. 1 and 2 of the drawings, and adapted for detachably receiving the coupling end of a flexible shaft, as will be detailed further hereinafter. The closure or cover 11 is provided with a side wall 11a and a rear wall 11b, the said rear wall being supplied with the strap handle 16 and the said side wall being provided with a locking means 17 and with the image finding elements 18, 19.

Figures 3, 4, 5:
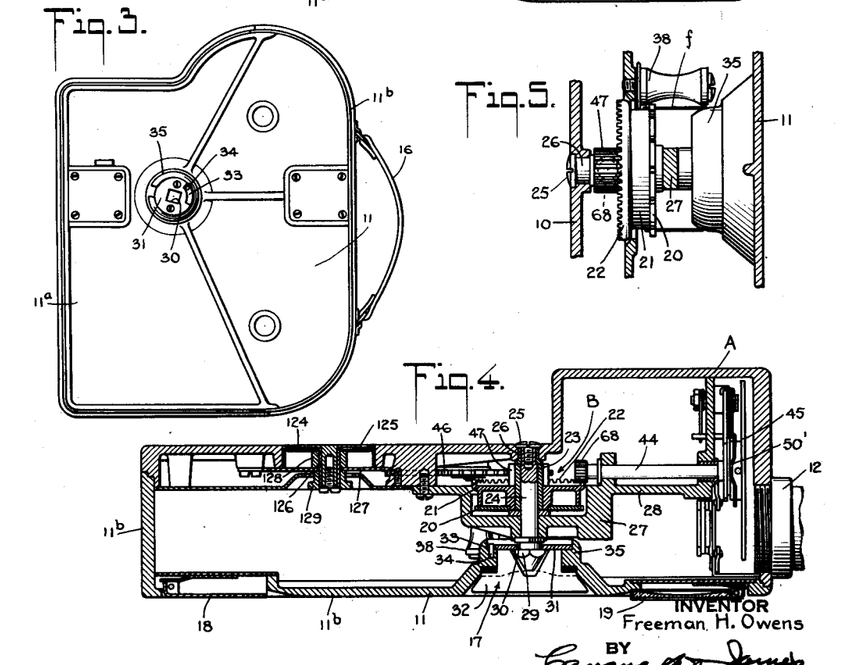
Fig. 3 is an inside view of the cover after it has been removed from the mating part shown in Fig. 2.
Fig. 4 is a view on an enlarged scale taken in cross-section in the plane of the line 4—4, Fig. 2, but with the cover attached to the camera.
Fig. 5 is a fragmentary view on an enlarged scale taken in cross-section in the plane of the line 5—5, Fig. 2.

The locking means 17 for the cover 11 cooperates with the continuous film feeding sprocket of the film operating mechanism B both for latching the cover of the camera casing and for guiding the movement of the film. The continuous film feeding sprocket comprises a single disk sprocket wheel 20 fixed to a drum 21 which has an integral crown gear 22, the said drum being rotatable with a sleeve 23 on a spindle 24 which is fixed to a side wall of the casing body 10 by the screw 25, the said spindle 24 being journalled in a bushing 26 in said wall and being also journalled in a boss or bridge 27 forming part of an interior partition 28 of the casing A. The free end of the spindle 24 is provided with a square-sided peg 29 which is received in a square opening 30 (see particularly Fig. 3) of a plate 31 which is fixed to the finger piece 32 of the locking means 17. The plate 31 is also provided with an arcuate slot 33 which, in conjunction with a pin 34 stationarily mounted in a projection or boss 35 forming part of the cover 11, define stop means for limiting the rotary movement of the locking means 17. The boss or projection 35, as best shown in Figs. 4 and 5 of the drawings, has a diameter substantially equal to that of the sprocket disk wheel 20. With this recited construction it will be seen that rotary manipulation of the finger piece 32 of the locking means 17 will effect a locking and unlocking relation between the cover 11 and the peg end 29 of the stationary spindle 24, permitting the cover 11 to be locked to and unlocked from the body 10 of the camera and projector casing. It will be further seen that the boss 35 of the cover 11 co-acts with the sprocket disk 20, as clearly shown in Fig. 5 of the drawings, for supportingly guiding the film *f* from a film feeding reel 36 to a film take-up reel 37, the movement of the film being further guided by guiding rollers 38, 38.

Referring now particularly to Figs. 6 to 10 of the drawings, the film operating and exposure mechanism B comprises film operating means including an intermittent film driving means generally designated as C, continuous film operating means generally designated as D, and film shuttering or exposure means collectively designated as E, all forming mechanism common to both camera and projector operation and adapted to be interchangeably driven from either a camera motor means F housed in the camera casing A or from an external motor source through a flexible shaft coupling device detachably receivable by the means 15 aforesaid mounted in the front wall of the casing body 10.

Figure 9:
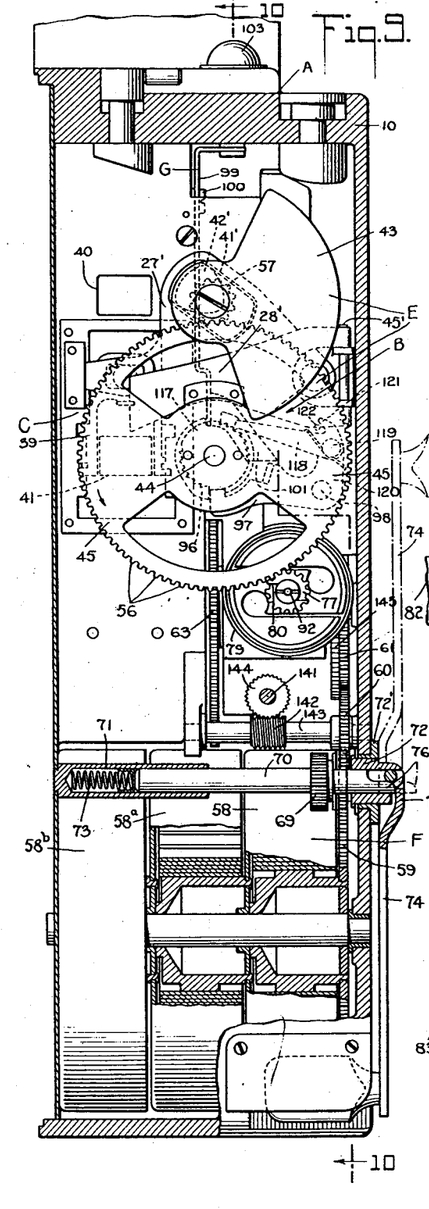
Fig. 9 is a front elevational view taken in cross-section in the plane of the line 9—9, Fig. 6.
Figure 10:
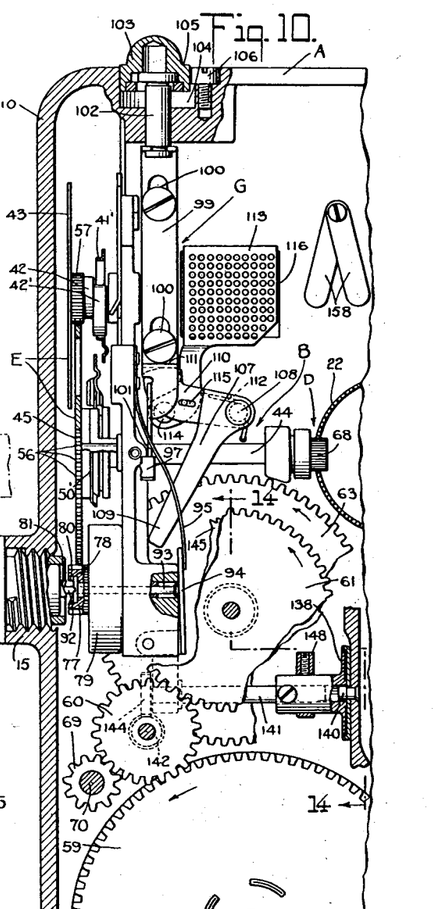
Fig. 10 is a side view taken in cross-section in the plane of the line 10—10, Fig. 9, Fig. 10ª is a cross-sectional view of a detail.
Figure 10A:
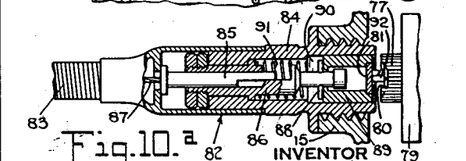

The intermittent film operating means C is but generally disclosed in Figs. 9 and 10 of the drawings, and is set forth more in detail and claimed in my copending application to motion picture apparatus, Serial No. 267,159, filed April 4, 1928, since issued on November 24, 1931 as Patent 1,833,371. Briefly considered, this intermittent film operating means C consists of a device 39 for intermittently engaging and moving the film past the projector and camera windows 40 and 41, the said device being moved longitudinally to correspondingly move the film by means of an oscillatable element 27' oscillated by eccentric cam and eccentric strap means 42' and 41', the said eccentric cam 42' being fixed to the shaft 42 of the projector shuter 43, the to-and-fro or film engaging and disengaging movements of the device 39 being effected by the transverse oscillations of an arm 28' oscillating about an axis 45' and operated by a cammed plate 50' fixed to the shaft 44 of the camera shutter 45, all as more specifically disclosed in my aforesaid copending application. The operations of the intermittent film feeding means C are thus produced by means actuated from the camera and projector shutter shafts 42 and 44.

Figure 6:
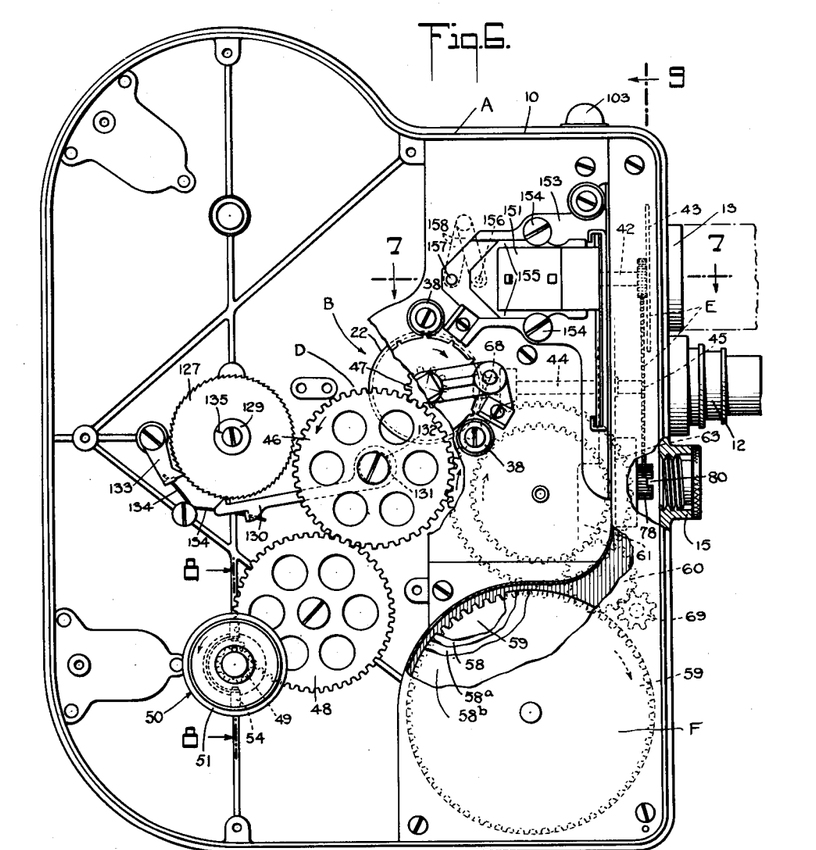
Fig. 6 is a side elevational view of the apparatus taken on an enlarged scale and showing the same similar to Fig. 2 save for parts removed and other parts broken away.
Figure 8:
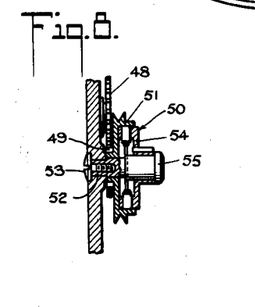
Fig. 8 is a view of a detail taken in cross-section in the plane of the line 8—8, Fig. 6.

The continuous film operating means D comprises the film feeding disk sprocket 20 already described which is operated either from the camera shutter shaft 44 (when the mechanism is used as a projector) or from a driven gear 46 (when the mechanism is used as a camera), the said driven gear 46 meshing at one side with a pinion 47 fixed to the sleeve 23 of the sprocket wheel 20 and meshing at its opposite side with the gear 48 which in turn meshes with a pinion 49 fixed to a friction clutch device 50 forming part of the film take-up means. The friction clutch for the take-up device is best shown in Figs. 6 and 8 of the drawings, and comprises a clutch element 51 rotatable on a stud 52 secured by the screw 53 to a wall of the camera casing, to which clutch element the pinion 49 is attached, and a complemental clutch element 54 also rotatable on the stud 52 and held thereon by the head 55, the said complemental clutch element 54 being adapted to be coupled to a take-up reel such as 37.

The exposure shutters collectively designated as E and separately at 43 and 45 are operated in unison from the shutter drive or driven shaft 44 by means of peripheral gear teeth 56 formed on the camera shutter 45 meshing with the pinion 57 fixed to the shaft of the projector shutter 43.

Figure 14:
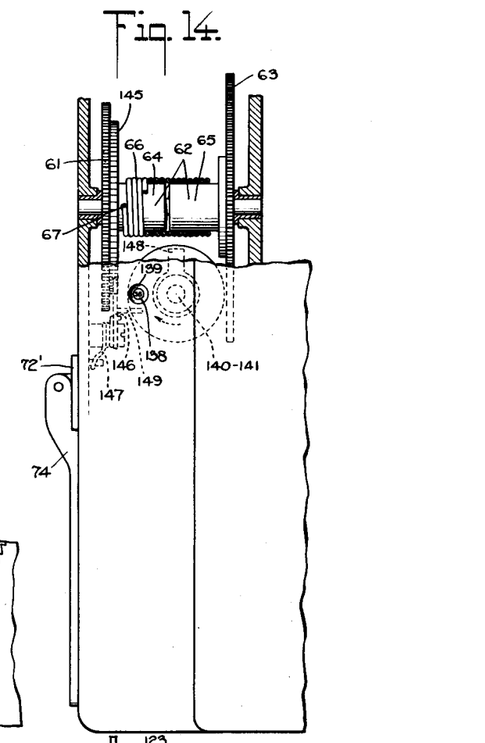
Fig. 14 is a view taken in cross section in the planes of the broken line 14—14 of Fig. 10.

When the film operating and exposure mechanism B, consisting of the intermittent film feeding means C, the continuous film feeding means D, and the shuttering means E, is operated for camera use, the driven gear 46 is operated from the spring motor F. The spring motor F may comprise a motor made of a plurality of connected sections 58, 58$^a$ and 58$^b$ designed for driving a substantial length of film, the section 58 being provided with a driving gear wheel 59 which meshes with the idler 60 meshing in turn with a gear 61 connected by means of a one-way spring clutch 62 (see Fig. 14) to a gear wheel 63, said gear wheel meshing with the driven gear 46. The one-way clutch 62 comprises the relatively rotatable drum sections 64 and 65 fixed respectively to the gears 60 and 63 and embraced by a coil spring 66 anchored at 67 to the drum section 64 and unanchored to the drum section 65. When the motor F is energized and the mechanism B unlocked in the manner hereinafter described, energy will be transmitted from the motor driven gear 61 through the clutch 62 to the driven gear 46 for operating the film feeding and exposure mechanism B, the clutch 62 being automatically effective as the driving connection by reason of the winding effect exerted on the coil 66 by the proper direction of rotation of the gear wheel 61. It will be noted that during this driving operation the intermittent film feeding means C and the shuttering mechanism E are operated through the shaft 44 from the continuous film feeding means D through the meshing engagement of the crown gear 22 with a pinion 68 fixed to the inner end of the shutter shaft 44.

For winding or rewinding the spring motor F, I provide a winding pinion 69 fixed to a slidable shaft 70 journalled at one end in a tubular casing 71 and at the other end in a sleeve 72 rotatable in a bushing 72' in a side wall of the casing section 10, the said tubular casing 71 housing a spring 73 which urges the slidable shaft 70 for movement from the full-line position to the dash-dotted-line position shown in Fig. 9 of the drawings. In the full-line position the rewinding pinion 69 is disengaged from the idler 60 and in the dash-dotted-line position the winding pinion is engaged with the idler 60, as illustrated in Fig. 10 of the drawings. Hingedly movable on the sleeve 72 is a crank arm 74 which is movable between the full and dash-dotted line positions shown in Fig. 9 of the drawings, the said crank arm 74 being provided with a part 75 which engages with a projecting part 76 integral with the slidable shaft 70, the arrangement being such that when the crank arm 74 is moved to the inoperative position shown in full lines in Fig. 9 of the drawings, the shaft 70 is engaged to move the driving pinion 69 into inoperative position; but when the crank arm 74 is moved to the winding position shown in the dash-dotted-lines in Fig. 9 of the drawings, the shaft 70 is released, and urged by the spring 73, is moved into meshing engagement with the idler 60 so that operation of the crank arm 74 will result in winding the spring motor F. It will be noted, however, that during the winding operation the gear wheel 61 will rotate in a direction opposite to its driving direction, with the result that the coil spring 66 of the clutch device 62 is free to move, while the film operating mechanism and its driving gear 63 may be held in the locked position hereinafter described. The arrows in the drawings applied to the camera driving and driven parts give the directions of movement during unwinding or driving condition of the motor.

Figures 11, 15:
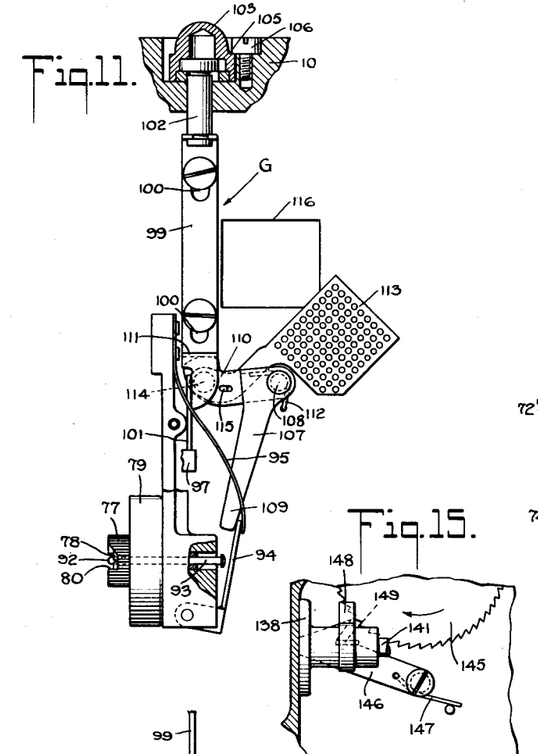
Fig. 11 is a view of certain parts shown in Fig. 10 but in a different position of operation.
Fig. 15 is a view of a detail.

The mechanism B is driven as a projector by connecting the shutter end of the shaft 44 to an electric motor arranged externally of the casing A. To accomplish this, I provide a gear wheel 77 for meshing relation with the gear teeth 56 of the shutter 45, the said gear wheel 77 being mounted for rotation on a headed stud 78 fixed to a support 79, and said gear wheel is designed to include a clutch element 80 (see particularly Figs. 10, 10ª and 11) which is adapted for mating relation with a complemental clutch element 81 forming part of a detachable coupling member generally designated as 82.

As shown particularly in Fig. 10ª of the drawings, the coupling member 82, fitted to one end of a flexible shaft 83, includes a threaded nipple 84 threadedly received by the means 15 of the front wall of the camera casing, in which nipple are rotatably mounted the relatively slidable but rotatively coupled members 85 and 86, the member 85 being connected to the flexible cable 87 and the member 86 being provided with a cross pin 88 forming a clutch element. Slidably movable relatively to the member 86 and rotatably movable therewith is a block 89 provided at its inner end with a groove seat 90 for the cross pin 88 and at its other end with the complemental clutch element 81. In a cavity in the nipple 84 is an expansion spring 91 which is active against the block 89 to move the same from the position shown in Fig. 10ª of the drawings to a position where the complemental clutch element 81 drivingly engages with the clutch element 80 of the gear wheel 77. The clutch element 81 is, however, provided with a pin 92 which is adapted to be acted upon by an aligned pin 93 movable in the support 79, movement of the aligned pin 93 being controlled by a pivoted arm 94 active on the outer end thereof and a leaf spring 95 active on the arm 94.

By reference to Figs. 10, 10ª and 11 of the drawings, it will be seen that when the parts are as shown in Figs. 10 and 10ª of the drawings, the spring 95 acts through the aligned pins 92 and 93 to move the block 89 against the action of the weaker spring 91 so as to cause decoupling between the coupling device 82 and the driving gear wheel 77 and that when the parts are as shown in Fig. 11 of the drawings, with the arm 94 disengaged from the pin 93, the block 89, urged by its spring 91, will be moved to cause engagement of the clutch elements 80 and 81 so that then the flexible cable 87 is connected in driving relation with the shutter shaft 44 and through this shutter shaft with the mechanism B as a whole. Thus control of the arm 94 will permit the mechanism B to be connected with the flexible drive shaft and will also permit the said mechanism to be disengaged from the drive shaft whereby the mechanism can be stopped while the electric motor is left running.

Figure 12:
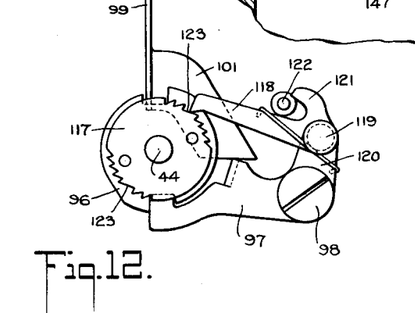
Figs. 12 and 13 are views showing the operation of certain parts of the control means for the film operating and exposure mechanism of the machine in different positions of operation.
Figure 13:
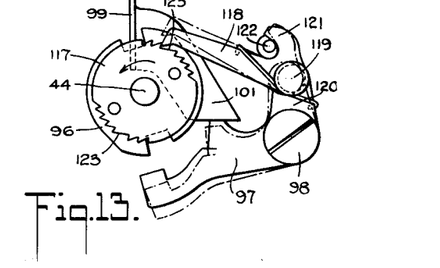

For controlling the operation of the mechanism B, I provide a start and stop device generally designated as G (see particularly Figs. 9 to 13) which is adapted to be manipulated manually and which is effective for locking and unlocking the operating mechanism B, the said operating mechanism being preferably locked with the camera shutter in closed position to prevent exposure, and with the projector shutter in open position to permit still projection of pictures. This start and stop device G is preferably operative directly on the shutter shaft 44, and to this end comprises a locking cam 96 fixed to the shutter shaft 44 with which cooperates a locking pawl 97 pivoted at 98. Figs. 9 and 12 show these locking elements in the shutter shaft locking position, while Fig. 13 shows these elements in unlocked position, leaving the shaft 44 free to rotate in the direction shown by the arrow in Fig. 13. For moving the locking pawl 97 to the unlocking position, I provide a slide member 99 guidingly movable in the spaced pin and slot elements 100, 100, said slidable member being provided at its bottom with an operating arm 101 and being connected at its top with a depressible headed stud 102 which is capped by an operating button 103. The operating button 103 is movable in an enlarged cavity 104 in the casing A and is attached to the headed stud 102 so as to permit transverse movement of the button 103 relative to the head of the stud 102. The purpose for this relative transverse movement is to permit the latching of the button 103 by engagement of the shoulder 105 thereof with the head of a screw 106. This will be seen by a comparison of Figs. 10 and 11 of the drawings. In Fig. 10 the button 103 is in the elevated position with the parts of the mechanism B locked. To unlock the mechanism B and latch the same in unlocked position, the button 103 is depressed and then slid for latching engagement with the screw 106, as shown in Fig. 11 of the drawings.

In the preferred construction, operation of the start and stop device G is made effective for controlling the coupling connection between the mechanism B and the flexible shaft 83 so that when the mechanism B (used as a projector) is locked, it will be decoupled from the continuously rotating flexible shaft 83, and when said mechanism is unlocked, it will be simultaneously coupled to the flexible shaft 83. To accomplish this, I provide means actuated by movement of the slide member 99 for controlling the movement of the spring pressed operating arm 94 heretofore described. This means preferably comprises a lever 107 pivoted at 108 having an arm 109 co-acting with the operating arm 94 and having a second arm 110 engaged by a shoulder 111 forming part of the slide member 99. With this construction depression of the button 103 and slide member 99 operates the lever 107 to the position shown in Fig. 11, permitting the clutch elements 80 and 81 to become engaged; and release of the button 103, by the action of a spring 112 which urges the lever 107 to its return position, will return the slide member 99 and its operating button to the normal or return position shown in Fig. 10 of the drawings, the leaf spring 95 being then active on the operating arm 94 to cause the decoupling of the mechanism B from the flexible shaft. The return movement or elevation of the slide member 99 and its button will cause the locking pawl 97 to move into locking engagement with the cam 96 and thus stop and lock the operating mechanism B simultaneously with the decoupling of the driving parts.

When the mechanism B used as a projector is locked for still picture projection, it is preferred to provide a fire shutter which is arranged to intercept a light beam, and preferably this fire shutter is in the present invention operated simultaneously with the operation of the start and stop device and by the same means. To accomplish this, I provide a fire shutter 113 pivotally mounted on the pin 114 and connected to the lever 107 by the pin and slot means 115. By means of this structure, it will be evident that with the parts as shown in Fig. 11 of the drawings, when the mechanism B is operating, the fire shutter 113 will be moved out of registry with the window 116 and therefore in open position, and with the parts as shown in Fig. 10 of the drawings when the mechanism B is stopped and locked, the fire shutter 113 will be moved into registry with the window 116 and therefore into a position to intercept the light beam from the lamp house.

For the purpose of supplementing the action of the motor F so as to overcome the starting inertia thereof, I prefer to provide means which functions to impart to the mechanism B a kick-off or starting impulse, with the result that the mechanism B is started almost instantaneously when unlocked, so that the first few pictures taken in the operation of the camera are as good as those subsequently taken, and particularly when the spring is partially deenergized and has but a few feet to run. This kick-off means is preferably effective on the shutter shaft 44 and comprises a ratchet wheel 117 fixed to the shaft 44 with which cooperates a pawl 118 (see particularly Figs. 9, 12 and 13). The pawl 118 is pivotally mounted at 119 on an arm 120 forming part of the locking pawl 97 and is also provided with a hook 121 which is adapted to be engaged by a stationary pin 122. Desirably, opposed teeth 123, 123 of the ratchet 117 are elongated for the cooperation of the pawl 118 which will now be set forth.

With this construction of the kick-off means, it will be seen that when the locking pawl 97 is moved from the locking position shown in Fig. 12 of the drawings to the unlocking position shown in Fig. 13 of the drawings, the pawl 118 will be operated first into quick driving engagement with the teeth of the ratchet 117 actuated by the arm 120 of the locking pawl 97 and will then, due to the engagement between the hook 121 and pin 122, be moved out of engagement with the ratchet 117, both as clearly shown in Fig. 13 of the drawings, whereby a sudden driving impulse is imparted to the shutter shaft 44, the pawl and ratchet being then disengaged to permit freedom of rotation of the shutter shaft and the remaining parts of the mechanism B. Return movement of the locking pawl 97 to the position shown in Fig. 12 returns the ratchet 118 to its position in engagement with a long tooth 123 ready for another impulse operation.

Associated with the driving mechanism B and operated thereby, I prefer to provide a footage counter or means for indicating the number of feet of film exposed particularly for the camera. This footage counter is shown particularly in Figs. 2, 4 and 6 of the drawings, and is shown to comprise a dial 124 visible through a window 125 in a side wall of the casing A, the said dial being secured to a sleeve shaft 126 to which is fixed a ratchet wheel 127 by being secured between a washer 128 and a finger knob 129. The ratchet wheel 127 is adapted to be actuated by a reciprocable pawl member 130 having an eccentric strap part 131 surrounding an eccentric element 132 (see Fig. 6) which is fixed to the shaft of the gear wheel 46. To prevent reverse rotation of ratchet wheel 127 I provide a pawl 133, and both pawls 130 and 133 are acted upon by the ends of a spring 134. In operation, the movement of the driven gear 46 will actuate the footage counter by the reciprocation of the pawl 130. The footage counter may be set by hand by manipulating the finger knob 129. Preferably said finger knob is provided with an indicating line 135 which is adapted to be aligned with an indicating line 136 formed on a stationary partition 137 of the casing A to set the footage counter in starting position (see particularly Fig. 2 of the drawings).

The motor F is preferably provided with means for stopping the same before the same is completely deenergized, this is so as to eliminate the use of the weak part of the motor drive, and preferably I provide a footage dial or indicating means which is adapted to indicate the number of feet of film that can be run with the spring motor before the same is automatically stopped. This apparatus is shown particularly in Figs. 9, 10, 14 and 15 of the drawings. The spring counter or indicator comprises a dial 138 visible through a window 139, which dial is journalled in a stud 140 and is fixed to a shaft 141, the said shaft being geared to the driving idler 60 by means of a worm 142 on the shaft 143 of the idler 60 and a worm wheel 144 secured to the shaft 141. The operation of the motor in both directions will operate the dialing elements. Actuation of the dialing elements controls the stopping means for the motor, the said stopping means comprising a ratchet wheel 145 fixed to the drum section 64 or the gear wheel 61, with which cooperates a toothed member 146 normally urged by a spring 147 away from the ratchet wheel 145. The shaft 141 of the dialing means is provided with a finger 148 which in the operation of the shaft is adapted to engage with an out-turned portion 149 of the toothed member 146 so that when the dial rotating in the direction shown in Fig. 14 of the drawings reaches the end of its rotation, the finger 148 engages the out-turned portion 149 and moves the pawl 146 against its spring action into stopping engagement with the ratchet wheel 145. The spring is thus stopped and rewinding of the spring will move the dialing elements to their return or initial positions.

Figure 7:
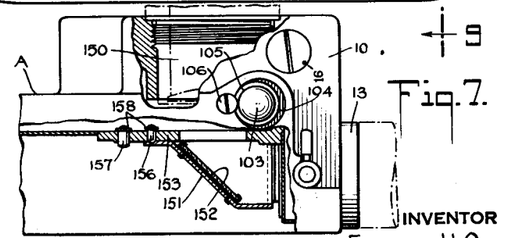
Fig. 7 is a view taken in cross-section in the plane of the line 7—7, Fig. 6.

The camera casing A when used as a projector is adapted to be attached to a lamp house, as disclosed in my copending application Serial No. 267,157, filed April 4, 1928, and this attachment is accomplished by pivotally mounting the casing A on a condenser lens mounting 150 of the lamp house, as indicated in Fig. 7 of the drawings. For directing the illumination beam to the film gate, I provide a mirror mount 151 having a mirror 152 set at an angle of 45° as shown in Fig. 7 of the drawings, the said mount being slidable in a support 153, and being held thereto by the engagement between a pair of screws 154, 154 on the support 153 with the flanges 155 of the mount 151 as clearly shown in Fig. 6 of the drawings. The mount is held against movement in the position shown in Figs. 6 and 7 by a spring pressed pin 156 cooperating with a mating recess or dimple on the mirror mount 151, as is shown in Fig. 7. The mirror mount may be slid to the rear against a stop pin 157 to facilitate threading of the film, and may be removed from the support by depressing the stop pin 157 against the action of a V-shaped spring 158, the ends of which spring act upon both the pins 156 and 157.

The use and operation of the improvements in the combined motion picture projector and camera of my present invention and the many advantages thereof will in the main be fully apparent from the above detailed description thereof. It will be further apparent that while I have shown and described my device in its preferred form, many changes and modifications may be made in the structure disclosed without departing from the spirit of the invention, defined in the following claims.

I claim:

1. In a combined motion picture projector and camera, film operating and exposure mechanism, a motor for the mechanism when used as a camera, clutch means for connecting the mechanism to a second motor when said mechanism is used as a projector, a start and stop device for said mechanism, and a manually manipulable means for simultaneously operating the clutch means and the start and stop device.

2. In a combined motion picture projector and camera, film operating and exposure mechanism including a camera shutter and a projector shutter, a spring motor for the mechanism when used as a camera, clutch means for connecting the mechanism to a second motor when said mechanism is used as a projector, a start and stop device for said mechanism operative for locking the camera shutter in closed position and the projector shutter in open position, and a manually manipulable means for simultaneously operating the clutch means and the start and stop device.

3. In a combined motion picture projector and camera, film operating and exposure mechanism including a camera shutter and a projector shutter, a spring motor for the mechanism when used as a camera, disconnectable clutch means for connecting the mechanism to a second motor when said mechanism is used as a projector, a start and stop device for said mechanism operative for locking the camera shutter in closed position and the projector shutter in open position, and manually manipulable means for operating the start and stop device.

4. In a combined motion picture projector and camera, film operating and exposure mechanism including a camera shutter, a projector shutter, and a fire shutter, a spring motor for the mechanism when used as a camera, clutch means for connecting the mechanism to a second motor when said mechanism is used as a projector, a start and stop device for said mechanism operative for locking the camera shutter in closed position and the projector and fire shutters in open position, and a manually manipulable means for simultaneously operating the clutch means and the start and stop device.

5. In a combined motion picture projector and camera, film operating and exposure mechanism, a spring motor for the mechanism when used as a camera, means for connecting said mechanism to a second motor when the mechanism is used as a projector, and clutch means arranged between the spring motor and said mechanism automatically effective as a driving connection between the spring motor and the mechanism when the mechanism is driven as a camera and automatically ineffective as a driving connection when said mechanism is driven as a projector.

6. In a combined motion picture projector and camera, a casing, film operating and exposure mechanism in said casing, a spring motor for the mechanism when used as a camera located in the casing, means for connecting said mechanism to an externally arranged second motor when the mechanism is used as a projector, and clutch means arranged between the spring motor and said mechanism automatically effective as a driving connection between the spring motor and the mechanism when the mechanism is driven as a camera and automatically ineffective as a driving connection when said mechanism is driven as a projector.

7. In a combined motion picture projector and camera, film operating and exposure mechanism, a spring motor for the mechanism when used as a camera, means for connecting said mechanism to a second motor when the mechanism is used as a projector, clutch means arranged between the spring motor and said mechanism automatically effective as a driving connection between the spring motor and the mechanism when the mechanism is driven as a camera and automatically ineffective as a driving connection when said mechanism is driven as a projector, means for winding said spring motor and a start and stop device for said mechanism operative as a lock for the same, the said clutch means being effective to permit winding of said motor while the said mechanism is locked.

8. In a combined motion picture projector and camera, film operating and exposure mechanism, a spring motor for the mechanism when used as a camera, a first clutch means for connecting said mechanism to a second motor when the mechanism is used as a projector, a second clutch means arranged between the spring motor and said mechanism automatically effective as a driving connection between the spring motor and the mechanism when the mechanism is driven as a camera and automatically ineffective as a driving connection when said mechanism is driven as a projector, a start and stop device for said mechanism, and a manually manipulable means for simultaneously operating the first clutch means and the start and stop device.

9. In a combined motion picture projector and camera, a casing, film operating and exposure mechanism in said casing, a spring motor for said mechanism in said casing and operative when said mechanism is used as a camera, means in a wall of said casing for detachably receiving a flexible shaft connectable to an external motor and used when said mechanism is employed as a projector, and manually manipulable means on said casing for controlling the driving connection between the flexible shaft and said mechanism.

10. In a combined motion picture projector and camera, a casing, a film operating and exposure mechanism in said casing, a spring motor for said mechanism in said casing and operative when said mechanism is used as a camera, a flexible shaft having a clutch coupling device at one end thereof, means in a wall of said casing for detachably receiving said coupling device, the other end of said flexible shaft being connectable to an external motor and used when said mechanism is employed as a projector, and manually manipulable means on said casing for controlling the operation of the clutch coupling device to control the connection between the flexible shaft and said mechanism.

11. In a combined motion picture projector and camera, a casing, film operating and exposure mechanism in said casing, a spring motor for said mechanism in said casing and operative when said mechanism is used as a camera, a flexible shaft having a coupling device at one end thereof, and means in a wall of said casing for detachably receiving said coupling device, the other end of said flexible shaft being connectable to an external motor and used when said mechanism is employed as a projector.

12. In a combined motion picture projector and camera, a casing, film operating and exposure mechanism in said casing, a spring motor for said mechanism in said casing and operative when said mechanism is used as a camera, a flexible shaft having a spring controlled clutch coupling device at one end thereof, means in a wall of said casing for detachably receiving said coupling device, the other end of said flexible shaft being connectable to an external motor and used when said mechanism is employed as a projector, a complemental clutch member in said casing connected to the said mechanism therein, and manually manipulable means in said casing for controlling the coupling between the spring controlled clutch coupling device of said flexible shaft and said complemental clutch member.

13. In a combined motion picture projector and camera, film operating and exposure mechanism including a film exposure shutter and a shutter shaft, a spring motor for the mechanism operative to drive the mechanism as a camera, a projector shutter, means to drive the projector shutter, a start and stop device for said mechanism including a locking means for directly and positively locking said shutters in a desired relation, and a manually manipulable means for operating said start and stop device.

14. In a combined motion picture projector and camera, film operating and exposure mechanism including a film exposure shutter and a shutter shaft, a spring motor for the mechanism operative to drive the mechanism as a camera and connected to one end of said shutter shaft, means for connecting the other end of said shutter shaft to a second motor to drive said mechanism as a projector, a start and stop device for said mechanism for both camera and projector use thereof including a locking means for directly locking said shutter and shutter shaft, and a manually manipulable means for operating said start and stop device.

15. In a combined motion picture projector and camera, film operating and exposure mechanism including a film exposure shutter and a shutter shaft, a spring motor for the mechanism operative to drive the mechanism as a camera and connected to one end of said shutter shaft, means for connecting the other end of said shutter shaft to a second motor to drive said mechanism as a projector, a start and stop device for said mechanism for both camera and projector use thereof including a locking means for directly locking said shutter and shutter shaft, and a manually manipulable means for operating said start and stop device, said manually manipulable means including a depressible button and a latch means for said button.

16. In a combined motion picture projector and camera, film operating and exposure mechanism including a driven control shaft, a spring motor for the mechanism operative to drive the mechanism as a camera and connected to one end of said driven control shaft, means for connecting the other end of said control shaft to a second motor to drive said mechanism as a projector, a start and stop device for said mechanism including a locking means for directly locking said control shaft, and a manually manipulable means for operating said start and stop device.

17. In a combined motion picture projector and camera, film operating and exposure mechanism including a shutter and a film driving element connected one to the other, a spring motor for the mechanism operative to drive said mechanism as a camera, a clutch means interposed between said spring motor and the film driving element of said mechanism, and means arranged in advance of said shutter and shutter shaft for connecting the mechanism to a second motor for operating said mechanism as a projector.

18. In a combined motion picture projector and camera, film operating and exposure mechanism including a shutter and a film driving element connected one to the other, a spring motor for the mechanism operative to drive said mechanism as a camera, a one-way clutch means interposed between said spring motor and the film driving element of said mechanism, a second clutch means arranged in advance of said shutter and shutter shaft for connecting the mechanism to a second motor for operating said mechanism as a projector, and means for controlling the operation of said second clutch means.

19. In a motion picture apparatus, film operating and exposure mechanism, clutch means for operatively connecting or disconnecting said mechanism and a motor, a start and stop device for said mechanism, means for imparting a kick-off impulse to said mechanism upon starting release of said start and stop device, and a single manually manipulable means for simultaneously operating the clutch means, the kick-off means and the start and stop device.

20. In a motion picture apparatus, film operating and exposure or shutter mechanism, a start and stop device for positively stopping said mechanism while the shutter is in a desired position, means for imparting a kick-off impulse to said mechanism upon starting release of said device, and a manually manipulable means for simultaneously operating the kick-off means and the start and stop device.

21. In a motion picture apparatus, means for controlling the operation of the film driving and exposure mechanism comprising a locking device for said mechanism, a clutch for connecting said mechanism to a motor, means for imparting a kick-off impulse to said mechanism, a fire shutter, and a manually manipulable means for simultaneously operating said clutch, kick-off means, fire shutter, and locking device.

22. In a motion picture apparatus, a casing, film operating and exposure mechanism in said casing, said mechanism including a clutch element, a flexible shaft having a clutch coupling device at one of its ends, means on said casing for detachably receiving the coupling device of said flexible shaft for clutching relation with said clutch element, said flexible shaft being connectable at its other end to a motor arranged externally of said casing, and manually manipulable means for controlling the clutching connection between said clutch coupling device and clutching element.

23. In a motion picture apparatus, a casing, film operating and exposure mechanism in said casing, said mechanism including a clutch element, a flexible shaft having a clutch coupling device at one of its ends, a spring in said shaft for urging the clutch thereof in one direction, means on said casing for detachably receiving the coupling device of said flexible shaft for clutching relation with said clutch element, said flexible shaft being connectable at its other end to a motor arranged externally of said casing, a spring in said clutch element operative on the clutch of the coupling device in opposition to the spring thereof, and manually manipulable means for controlling the action of the opposing springs for controlling the clutching connection between said clutch coupling device and clutching element.

24. In a motion picture camera apparatus, a driving control shaft operatively connected to film driving and shutter mechanism, means for positively controlling the stopping point of said shaft and of the film driving and shutter mechanism, a spring driving motor connectable to said shaft, means supplementing the action of said motor for imparting a kick-off impulse to said control shaft, and means for simultaneously operating the control means and kick-off means upon starting the operation of said mechanism.

25. In a combined camera and projector motion picture apparatus, film driving and shutter mechanism, means for positively controlling the stopping point of the film driving and shutter mechanism, said shutter mechanism including a shutter and shutter shaft, a spring driving motor connectable to said shutter shaft, means supplementing the action of said motor for imparting a kick-off impulse to said shutter shaft, and means for simultaneously operating the control means and kick-off means upon starting the operation of said mechanism.

26. In a motion picture apparatus, film operating and shutter mechanism including a control shaft, a motor connected to said control shaft, a start and stop device for said mechanism, means for imparting a kick-off impulse to said mechanism to supplement the action of the motor when the said start and stop device is released, said start and stop device including a latching element on said shaft and a locking pawl associated therewith for positively stopping said shaft with the shutter in desired position, said kick-off means including a ratchet element on said shaft and a pawl element movably related thereto, and means for simultaneously operating said start and stop device and kick-off means, the construction being such that upon releasing movement of said locking pawl, the pawl element is operated first into rotating engagement with said ratchet element and then into a position disengaged from said ratchet element.

27. In a motion picture apparatus, film operating and shutter mechanism including a control shaft, a motor connected to said control shaft, a start and stop device for said mechanism, means for imparting a kick-off impulse to said mechanism to supplement the action of the motor when the said start and stop device is released, said start and stop device including a latching element on said shaft and a locking pawl associated therewith for positively stopping said shaft with the shutter in desired position, said kick-off means including a ratchet element on said shaft and a pawl element movably related thereto, means connecting the locking pawl and ratchet element, and means effective on said locking pawl for simultaneously operating said start and stop device and kick-off means, the construction being such that upon releasing movement of said locking pawl, the pawl element is operated first into rotating engagement with said ratchet element and then into a position disengaged from said ratchet element.

28. In a motion picture apparatus, film operating and exposure mechanism including a shutter and shutter shaft, a motor connected to said shutter shaft, a one-way clutch between said shaft and motor, a start and stop device for said mechanism, means for imparting a kick-off impulse to said mechanism to supplement the action of the motor when the said start and stop device is released, said start and stop device including a latching element on said shaft and a locking pawl associated therewith for positively stopping said shaft with the shutter in desired position, said kick-off means including a ratchet element on said shaft and a pawl element movably related thereto, and means for simultaneously operating said start and stop device and kick-off means, the construction being such that upon releasing movement of said locking pawl, the pawl element is operated first into rotating engagement with said ratchet element and then into a position disengaged from said ratchet element.

29. In a combined camera and projector motion picture apparatus, a single film operating or moving mechanism for either camera or projector use, film exposure and shutter mechanisms for camera and projector use respectively, means causing the same to operate in unison, clutch means for operatively connecting or disconnecting said mechanism and a motor, a start and stop device for controlling said mechanism for either camera or projector use, said device serving to positively stop said mechanism while a picture is fully exposed for still projection, and a manually manipulable means for simultaneously operating the clutch means and the positive start and stop device.

30. In a combined camera and projector motion picture apparatus having separate camera and projector apertures, a single film operating or moving mechanism for either camera or projector use, film exposure and shutter mechanisms for camera and projector use respectively, means causing the same to operate in unison, clutch means for operatively connecting or disconnecting said mechanism and a motor, a start and stop device for controlling said mechanism for either camera or projector use, said device serving to positively stop said mechanism while a picture is fully exposed for still projection, and a manually manipulable means for simultaneously operating the clutch means and the positive start and stop device, said means including a depressible button and a latch for holding said button in depressed position when desired.

31. In a combined camera and projector motion picture apparatus, a single film driving mechanism for either camera or projector use, film exposure and shutter mechanisms for camera and projector use respectively, a clutch for operatively connecting or disconnecting said mechanisms and a motor, a locking device for positively stopping said mechanisms while the camera shutter is closed and the projector shutter is open, and control means for simultaneously operating said clutch and said positive locking device.

32. In a combined camera and projector motion picture apparatus, a single film driving mechanism for either camera or projector use, film exposure and shutter mechanisms for camera and projector use respectively, a clutch for operatively connecting or disconnecting said mechanisms and a motor, a locking device for positively stopping said mechanisms while a picture is fully exposed for still projection, a fire shutter, and a single control means for simultaneously operating said fire shutter, said clutch, and said locking device, in order to move the fire shutter into operative position when the film is stopped for still projection.

Signed at New York in the county of New York and State of New York this 3rd day of October A. D. 1928.

FREEMAN H. OWENS.